United States Patent
Priest (12)

(10) Patent No.: US 8,789,653 B2
(45) Date of Patent: Jul. 29, 2014

(54) TREE STAND SOUND DAMPENER

(75) Inventor: John Brian Priest, Dubuque, IA (US)

(73) Assignee: DDI, Inc., Dubuque, IA (US)

( * ) Notice: Subject to any disclaimer, the term of this patent is extended or adjusted under 35 U.S.C. 154(b) by 108 days.

(21) Appl. No.: 13/369,270

(22) Filed: Feb. 8, 2012

(65) Prior Publication Data

US 2012/0199418 A1  Aug. 9, 2012

Related U.S. Application Data

(60) Provisional application No. 61/440,855, filed on Feb. 8, 2011.

(51) Int. Cl.
*E06C 1/04* (2006.01)

(52) U.S. Cl.
USPC .............................. 182/46; 182/187; 182/100

(58) Field of Classification Search
USPC ................................... 182/187, 188, 100, 46
See application file for complete search history.

(56) References Cited

U.S. PATENT DOCUMENTS

| | | | |
|---|---|---|---|
| 2,855,980 A | 10/1956 | Konieczka | |
| 4,721,183 A | 1/1988 | Koniecka | |
| 4,727,961 A | 3/1988 | Dawson | |
| 5,060,756 A | 10/1991 | D'Acquisto | |
| 5,080,193 A | 1/1992 | Woof | |
| 5,143,177 A | 9/1992 | Smith | |
| 5,518,083 A | 5/1996 | Blennert | |
| 5,632,124 A * | 5/1997 | Weingarten et al. | 52/187 |
| 5,727,760 A * | 3/1998 | Wytovak et al. | 248/217.3 |
| 5,941,484 A * | 8/1999 | Stepney et al. | 248/201 |
| 5,971,104 A * | 10/1999 | Woller | 182/136 |
| 6,138,792 A * | 10/2000 | Morris | 182/93 |
| 6,247,553 B1 * | 6/2001 | Jones | 182/92 |
| D445,201 S | 7/2001 | D'Acquisto | |
| 6,394,473 B1 | 5/2002 | Platner | |
| 6,547,035 B1 | 4/2003 | D'Acquisto | |
| 6,568,505 B1 | 5/2003 | D'Acquisto | |
| 6,688,428 B2 * | 2/2004 | Carroll, Jr. | 182/127 |
| 6,866,120 B1 * | 3/2005 | Butterworth | 182/187 |
| 7,086,433 B1 | 8/2006 | Serman | |
| 7,246,683 B2 | 7/2007 | Pringnitz | |
| 7,516,707 B2 * | 4/2009 | Schrot | 108/152 |
| 7,891,465 B1 * | 2/2011 | Paul | 182/136 |
| 8,292,033 B2 * | 10/2012 | Hale | 182/187 |
| 2003/0034206 A1 * | 2/2003 | Carroll, Jr. | 182/127 |
| 2007/0107986 A1 * | 5/2007 | Cael | 182/187 |

(Continued)

OTHER PUBLICATIONS

Definition of 'coating' can be found in the Action The American Heritage Dictionary® of the English Language, Fourth Edition copyright © 2000 by Houghton Mifflin Company. Updated in 2009. Published by Houghton Mifflin Company. All rights reserved.*

*Primary Examiner* — Alvin Chin Shue
*Assistant Examiner* — Daniel Cahn
(74) *Attorney, Agent, or Firm* — Rathe Lindenbaum LLP

(57) ABSTRACT

A tree stand comprises a metal post, a lower platform pivotably coupled to the metal post for pivoting between a platform extended position and a platform folded position, an upper seat pivotably coupled to the post for pivoting between a seat extended position and a seat folded position, and a rubber or polymeric interface having a thickness of at least ⅛ of an inch and contacting the post and at least one of lower platform when lower platform is in the platform folded position, and the upper seat when the upper seat is in the seat folded position.

15 Claims, 8 Drawing Sheets

(56) References Cited

U.S. PATENT DOCUMENTS

2007/0151803 A1 7/2007 D'Acquisto
2008/0236948 A1 10/2008 DuCellier
2008/0314684 A1* 12/2008 Woller et al. .................. 182/187
2009/0014239 A1* 1/2009 Mancini .......................... 182/46
2010/0300808 A1* 12/2010 Hale .............................. 182/187
2011/0132686 A1* 6/2011 Priest ............................ 182/187

* cited by examiner

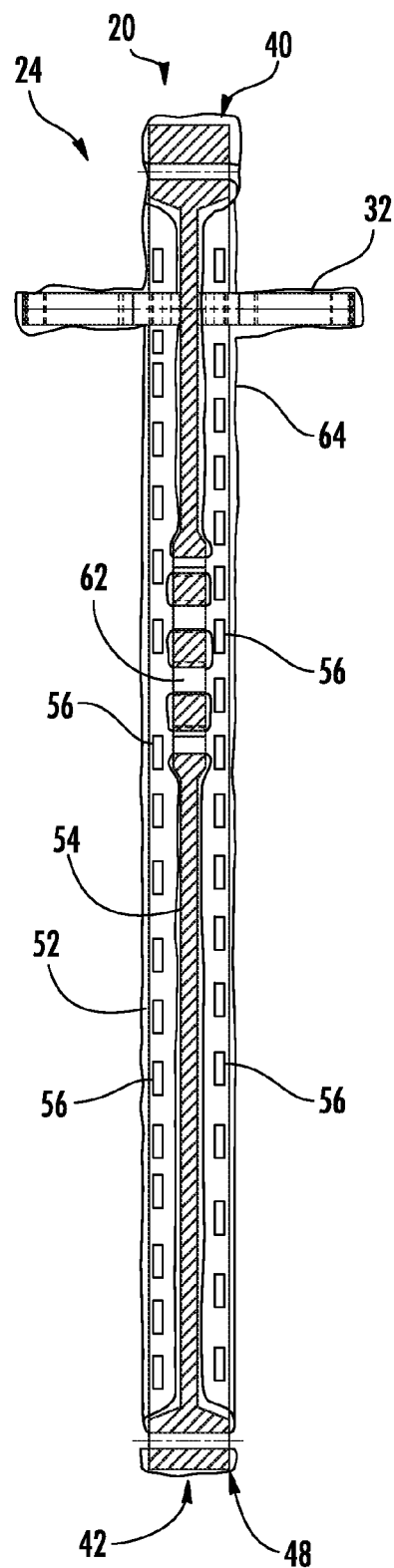
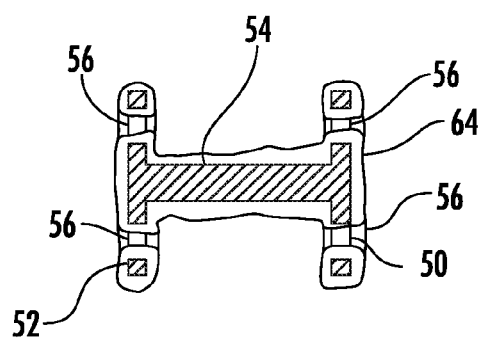
FIG. 4
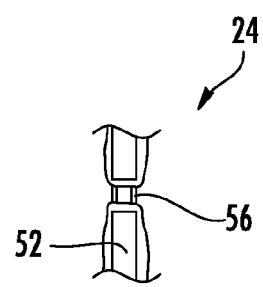
FIG. 4A
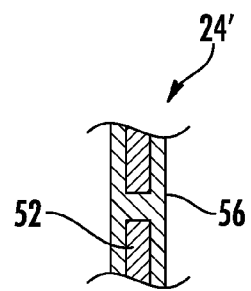
FIG. 4B
FIG. 3

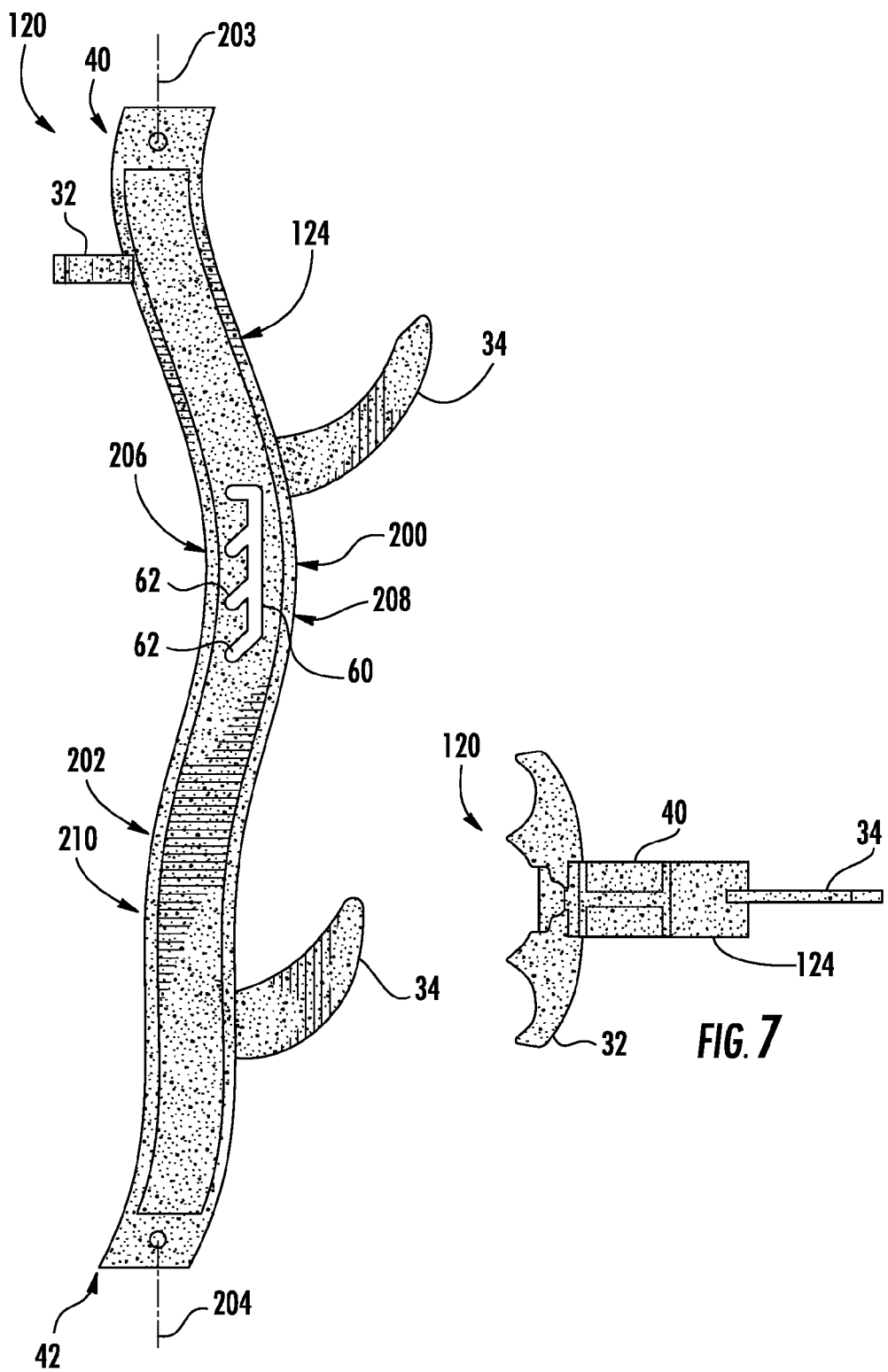

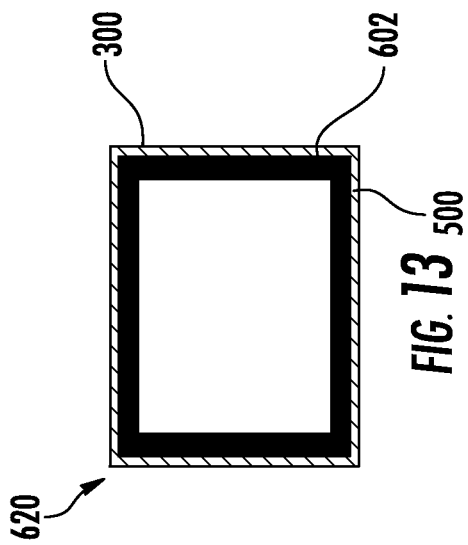
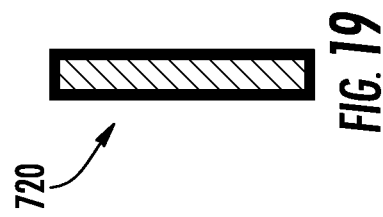
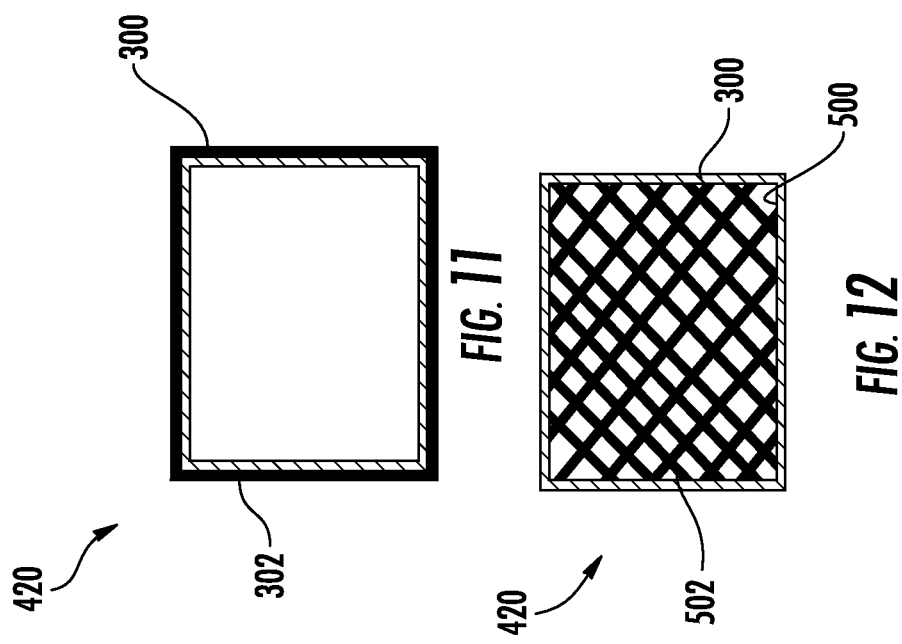

TREE STAND SOUND DAMPENER

CROSS-REFERENCE TO RELATED PATENT APPLICATIONS

The present application claims priority under 35 USC 119 (e) from U.S. provisional patent application Ser. No. 61/440,855 filed on Feb. 8, 2011 by John Brian Priest and entitled TREE STAND SOUND DAMPENER, the full disclosure of which is hereby incorporated by reference.

BACKGROUND

Tree stands are used to elevate a person above the ground on a tree to facilitate hunting or wildlife observation.

BRIEF DESCRIPTION OF THE DRAWINGS

FIG. 3 is a sectional view of the portions of the tree stand of FIG. 2 taken along line 3-3.

FIG. 4 is a sectional view of portions of the tree stand of FIG. 2 take along line 4-4.

FIG. 4A is an enlarged fragmentary sectional view of one example of the tree stand of FIG. 4.

FIG. 4B is an enlarged fragmentary sectional view of another example of the tree stand of FIG. 4.

FIG. 6 is a side elevation of view of portions of the tree stand of FIG. 5.

FIG. 7 is a top plan view of the portions of the tree stand of FIG. 6.

FIG. 11 is a sectional view of a portion of the tree stand of FIG. 8.

FIG. 12 is a sectional view of a portion of another implementation of the tree stand of FIG. 8.

FIG. 13 is sectional view of a portion of another implementation of the tree stand of FIG. 8.

FIG. 19 is a sectional view of a portion of another implementation of the tree stand of FIG. 1.

DETAILED DESCRIPTION OF THE EXAMPLE EMBODIMENTS

Figure 1:
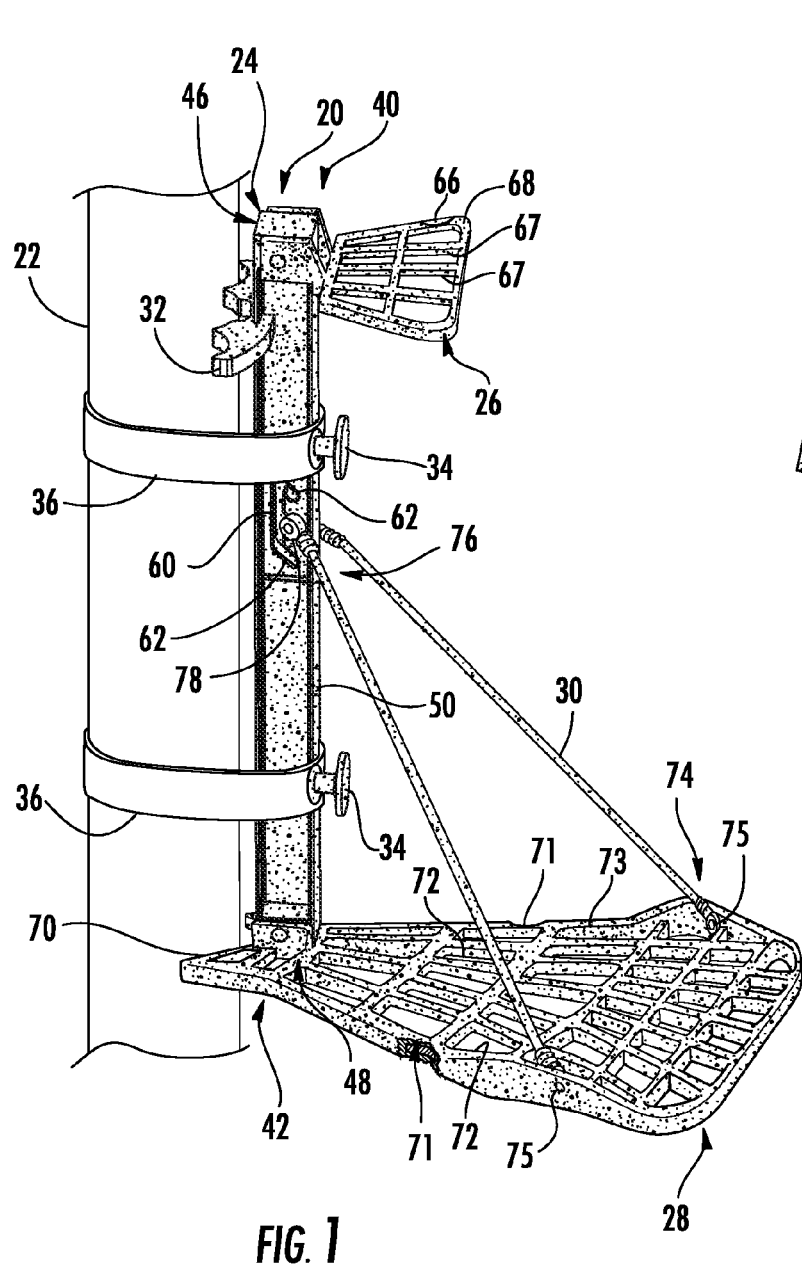
FIG. 1 is a perspective view of a tree stand mounted to a tree according to an example embodiment.

FIG. 1 is a perspective view of an example tree stand 20 mounted to a tree trunk 22. Tree stand 20 is mounted to the tree and provides one or more platforms upon which a person hunting or observing wildlife may stand or be seated. As will be described hereafter, tree stand 20 supports the person with reduced noise, allowing a person to be more inconspicuous and enhancing such hunting or wildlife observation. Tree stand 20 includes tree stand post 24, seat platform 26, foot platform 28, platform support line 30, tree claw 32, cinch lines 34 and tree straps 36.

Tree stand post 24 serves as a backbone, spine or rigid support member configured to extend along tree trunk 22 in a vertical direction. Post 24 supports one or more platforms and secures the one more platforms to tree trunk 22. In the example illustrated, post 24 supports and secures two platforms, seat platform 22 and foot platform 28, to one another and to tree trunk 22. In other embodiments, tree stand post 24 may secure and mount a greater or fewer of such platforms. For example, in other embodiments, seat platform 26 may be omitted.

As shown by FIGS. 1-4, tree stand post 24 longitudinally extends from an upper end 40 to a lower end 42. Proximate to end 40, post 24 includes a seat post mounting portion 46 configured to mount or be connected to seat platform 26. In the example illustrated, mounting portion 46 includes a bore such that seat platform 26 may be pinned to post 24. In other embodiments, mounting portion 46 may have other configurations facilitating removable connection of seat platform 26 to posts 24. In yet other embodiments, seat platform 26 may be integrally formed as a single unitary body with post 24.

Proximate to end 42, post 24 includes a foot platform mounting portion 46 configured to mount or be connected to foot platform 28. In the example illustrated, mounting portion 48 includes a bore such that foot platform 28 may be bolted or otherwise secured to post 24. In other embodiments, mounting portion 48 may have other configurations facilitating removable connection of foot platform 28 to posts 24. In yet other embodiments, seat platform 26 may be integrally formed as a single unitary body with post 24.

As shown by FIGS. 3 and 4, post 24 has a non-tubular cross-section longitudinally extending between ends 40 and 42. Post 24 omits longitudinal internal cavities or chambers. Post 24 omits body portions that are hollow. Because post 24 has a non-tubular cross-section, post 24 omits chambers which would otherwise act as a sound chambers amplifying noise generated by interaction between distinct parts of tree stand 20, generated by interaction between tree stand 20 and tree trunk 22 and generated by interaction between tree stand 20 and the person supported by tree stand 20. Reducing noise allows the person supported by tree stand 22 more inconspicuous when hunting or observing wildlife.

As shown by FIGS. 1 and 4, in the example illustrated, post 24 has an "I" cross sectional shape extending between ends 40 and 42. Post 24 has a front plate portion 50 (also known as a flange), a rear plate portion 52 (also known as a flange) and an intermediate plate portion 54 (also known as webbing). Front plate portion 50 and rear plate portion 52 extend substantially parallel to one another. Intermediate plate portion 54 interconnects plate portion 50 and 52. Intermediate plate portion extends substantially perpendicular to plate portions 50 and 52. Rear plate portion 52 provides surfaces for supporting tree claw 34. Front plate portion 52 provides surfaces for supporting tree strap posts 34.

As shown by FIGS. 3 and 4, each of plate portions 50 and 52 is perforate, including a plurality of apertures 56 extending through portions 50 and 52. Apertures 56 allow portions of the tree to be seen through post 24, further assisting in the concealing of post 24 by making post 24 less conspicuous to wildlife when positioned against a tree. In one embodiment, apertures 56 may be varied in size and shape and may have profiles, shapes or arrangements similar to the bark of the tree to which post 24 is mounted. In other embodiments, apertures 56 may be omitted.

Figure 2:
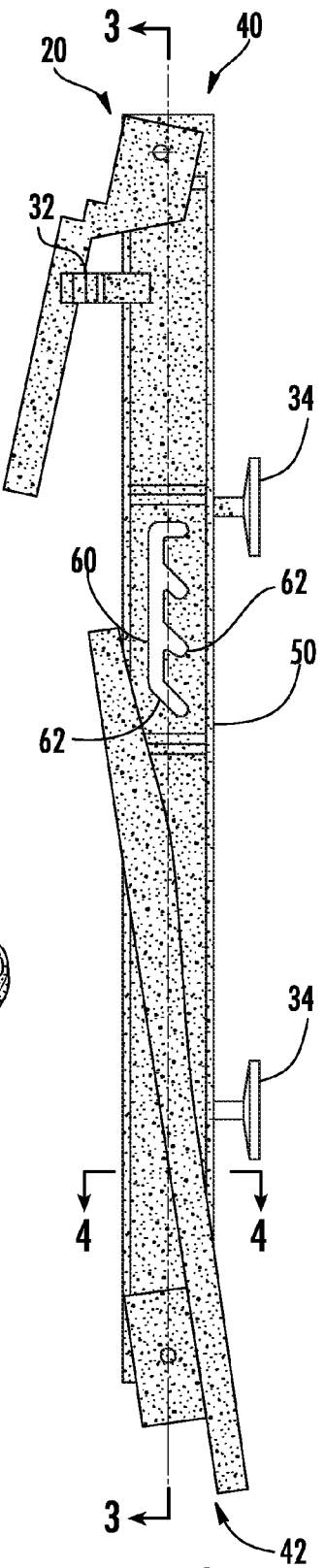
FIG. 2 is a side elevation of view of portions of the tree stand of FIG. 1 in a collapsed or folded state.

As shown by FIGS. 1-3, intermediate plate portion 54 includes a slot 60 which extends through plate portion 54. Slot 60 is located between portion 46 and 48. Slot 60 includes a plurality of longitudinally spaced hooks or notches 62. Notches 62 facilitate retention of various structures at different vertically spaced locations longitudinally along post 24. In the example illustrated, notches 62 receive platform support line 30. Notches 62 facilitate the supporting of foot platform 28 at different angles with respect to post 24. Because notches 62 are formed as part of the intermediate plate portion 54, additional structures for providing such notches 62 may be omitted.

As further shown by FIGS. 3 and 4, post 24 includes a sound dampening interface 64. Sound dampening interface 64 comprises one or more layers or structures of elastomeric or rubber-like polymeric or rubber materials, wherein sound dampening interface 64 has a thickness of at least ⅛ of an inch. Sound dampening interface 64 is located on post 24 at locations on post 24 that would otherwise contact platform 28 or seat 26 when platform 28 or seat 26 are in folded states in which seat 26 and platform 28 generally extend parallel to plate portions 50 and 52 or against portions 50 and 52. In the example illustrated, sound dampening interface 64 is also at locations on post 24 that would otherwise contact platform 28 or seat 26 when platform 28 or seat 26 are in extended states (as shown in FIG. 1) wherein seat 26 and platform 28 extend oblique and nominally perpendicular to post 50.

In the example illustrated, sound dampening interface 64 comprises a coating on portions of post 24. In the example illustrated, sound dampening interface 64 comprise a coating substantially covering and encapsulating post 24. As a result, vibrations and sound resulting from contact between seat 26 and platform 28 with post 24 are dampened and contained.

In one embodiment, as shown FIG. 4, the coating extends across but does not fill apertures 56, lessening a weight of post 24 (as enlarged in FIG. 4A). In yet other embodiments, post 24' may including an interface coating 56 that fills apertures 56, locking the coating in place (as shown in FIG. 4B). In other embodiments, sound dampening interface 64 may comprise a coating over less than complete or less than all portions of post 24. In yet other embodiments, interface 24 may comprise separate structures formed from rubber or polymeric materials which are fastened, bonded, fused, welded, snapped on to, clamped, pinned or otherwise retained against post 24 at locations so as to extend between and concurrently or simultaneously contact post 24 and seat 26, platform 28.

According to one example embodiment in which interface 64 comprises a coating, interface 64 comprises a polyurethane material having a thickness of at least ⅛ of an inch (3 mm) with a Shore A hardness of at least about 88+/−5 ASTM D-2240. In one embodiment, the coating of interface 64 is textured or dimpled. In another embodiment, the coating is smooth. In yet other embodiments, the coating of interface 64 may be formed from other materials. In some embodiments in which similar sound dampening interfaces are provided for seat 26 and/or platform 28, interface 64 on post 24 may be omitted.

Seat platform 26 (also referred to as a seat) comprises a platform mounted to mounting portion 46 that is configured to be sat upon by a person using tree stand 20. In the example illustrated, seat platform 26 comprises a perforate platform pinned or bolted to mounting portion 46 such that platform 26 may be pivoted between a withdrawn or folded position against tree trunk 22 in an orientation substantially parallel to post 24 and an extended position substantially perpendicular to post 24 as shown. Seat platform 26 includes an adjustable set screw on its lower side bearing against post 24 when seat platform 26 is in the extended, in use position.

In the example illustrated, seat platform 26 comprises a web, grid or lattice arrangement of metal strips 66 (shown in the broken away portion) having interstices 67 there between. In the example illustrated, seat or seat platform 26 includes a sound dampening interface 68. Sound dampening interface 68 comprises one or more layers or structures of elastomeric or rubber-like polymeric or rubber materials, wherein sound dampening interface 68 has a thickness of at least ⅛ of an inch. Sound dampening interface 68 is located on seat 26 at locations on seat 26 that would otherwise contact post 24 when seat 26 is in the folded state. In the example illustrated, sound dampening interface 68 is also at locations on seat 26 that would otherwise contact post 24 when seat 26 is in and extended state for (as shown in FIG. 1) wherein seat 26 extends oblique and nominally perpendicular to post 24.

In the example illustrated, sound dampening interface 68 comprises a coating on portions of seat 26. In the example illustrated, sound dampening interface 68 comprise a coating substantially covering and encapsulating seat 26. In particular, the coating of interface 68 encapsulates strips 66 extending through and not occluding the openings of interstices 67. As a result, vibrations and sound resulting from contact between seat 26 with post 24 are dampened and contained.

In other embodiments, sound dampening interface 68 may comprise a coating over less than complete or less than all portions of seat 26. In yet other embodiments, interface 68 may comprise separate structures formed from rubber or polymeric materials which are fastened, bonded, fused, welded, snapped on to, clamped, pinned or otherwise retained against seat 26 at locations so as to extend between and concurrently or simultaneously contact post 24 and seat 26.

According to one example embodiment in which interface 64 comprises a coating, interface 68 comprises a polyurethane material having a thickness of at least ⅛ of an inch (3 mm) with a Shore A hardness of at least about 88+/−5 ASTM D-2240. In one embodiment, the coating of interface 68 is textured or dimpled. In another embodiment, the coating is smooth. In yet other embodiments, the coating of interface 68 may be formed from other materials. In some embodiments in which similar sound dampening interfaces are provided for post 24, interface 68 on seat 26 may be omitted. In other embodiments, seat platform 26 may have other configurations or may be omitted.

Foot platform 28 comprises a lower platform mounted to mounting portion 48 of post 24. Foot platform 28 provides a surface upon which a person may stand or rest his or her feet. In the example illustrated, foot platform 28 comprises a perforate platform having a rear tree abutting portion 70 that bears against tree trunk 22. Portion 70 stabilizes foot platform 28 against tree 22 and offsets post 24 from tree trunk 22 such that post 24 may be substantially vertical and parallel to tree trunk 22. In other embodiments, foot platform 28 may have other configurations and may be connected to and supported by post 24 and tree trunk 22 in other fashions.

In the example illustrated, foot platform 28 comprises a web, grid or lattice arrangement of metal strips 71 (shown in the broken away portion) having interstices 72 there between. In the example illustrated, seat or foot platform 28 includes a sound dampening interface 73. Sound dampening interface 73 comprises one or more layers or structures of elastomeric or rubber-like polymeric or rubber materials, wherein sound dampening interface 73 has a thickness of at least ⅛ of an inch. Sound dampening interface 73 is located on platform 28 at locations on platform 28 that would otherwise contact post 24 when platform 28 is in the folded state. In the example illustrated, sound dampening interface 73 is also at locations on platform 28 that would otherwise contact post 24 when platform 28 is in and extended state for (as shown in FIG. 1) wherein platform 28 extends oblique and nominally perpendicular to post 24.

In the example illustrated, sound dampening interface 73 comprises a coating on portions of platform 28. In the example illustrated, sound dampening interface 73 comprise a coating substantially covering and encapsulating platform 28. In particular, the coating of interface 73 encapsulates or surrounds strips 66 while extending through the openings of interstices 67 so as to not occlude such openings. As a result, vibrations and sound resulting from contact between platform 28 with post 24 are dampened and contained.

In other embodiments, sound dampening interface 73 may comprise a coating over less than complete or less than all portions of platform 28. In yet other embodiments, interface 73 may comprise separate structures formed from rubber or polymeric materials which are fastened, bonded, fused, welded, snapped on to, clamped, pinned or otherwise retained against platform 28 at locations so as to extend between and concurrently or simultaneously contact post 24 and platform 28.

According to one example embodiment in which interface 73 comprises a coating, interface 73 comprises a polyurethane material having a thickness of at least ⅛ of an inch (3 mm) with a Shore A hardness of at least about 88+/−5 ASTM D-2240. In one embodiment, the coating of interface 73 is textured or dimpled. In another embodiment, the coating is smooth. In yet other embodiments, the coating of interface 73 may be formed from other materials. In some embodiments in which similar sound dampening interfaces are provided for post 24, interface 73 on platform 28 may be omitted. In other embodiments, foot platform 28 may have other configurations or may be omitted.

Platform support line 30 comprises one or more flexible lines connecting extended portions 74 of foot platform 28 to post 24 to support foot platform 28 in the extended position shown. In the example illustrated, platform support line 30 comprises a pair of lines having ends 75 fastened to extended portion 74 of foot platform 28 and opposite ends 76 fastened to a pin or two-headed bolt 78 removably received within one of notches 62. By selectively positioning bolt 78 within one of notches 62, an orientation angle of foot platform 28 may be adjusted.

Tree claw 32 comprises one or more structures extending from post 24 that are configured to grip tree trunk 22 and offset post 24 from tree trunk 22. In the example illustrated, tree claw 32 comprises an offset bracket. In other embodiments, tree claw 32 may have other configurations.

In the example illustrated, tree claw 32 is integrally formed as a single unitary body with post 24. In the example illustrated, tree claw 32 is integrally cast with post 24. Because tree claw 32 is integral with post 24, tree claw 32 cannot move relative to post 24 even in cold weather where offset brackets merely fastened to post 24 might otherwise shrink and move relative to post 24 as a person upon tree stand 20 moves or shifts his or her weight. As a result, squeaking or other sounds resulting from such relative movements is prevented, allowing tree stand 20 to be quieter. Because tree stand 20 is quieter, wildlife observation is enhanced In the example illustrated, platform support line 30 comprises a pair of steel cables. In other embodiments, line 30 may comprise a pair of straps or may comprise a single continuous flexible line. In some embodiments, line 30 may be omitted.

Cinch line posts 34 comprise pins, hooks, protuberances or other male projections extending from post 24 which are configured to be removably fastened to cinch lines 36. Posts 34 are integrally formed as a single unitary body with post 24. In the example illustrated, posts 34 are integrally cast with post 24. Because posts 34 are integral with post 24, posts 34 cannot move relative to post 24 even in cold weather where bolts or other fasteners might otherwise shrink and move relative to post 24 as a person upon tree stand 20 moves or shifts his or her weight. As a result, squeaking or other sounds resulting from such relative movements is prevented, allowing tree stand 20 to be quieter. Because tree stand 20 is quieter, wildlife observation is enhanced.

In the example illustrated, post 24 and the integral features such as claw 32 and posts 34 are cast. In one embodiment, post 24 and the integral features are cast out of one of more metals such as aluminum. In other embodiments, post 24 and the integral features may be formed from other metals, ceramics, plastics and the like and may be formed using methods other than casting. In other embodiments, one or both of claw 32 and posts 34 may alternatively be joined to post 24 in other manners such as using fasteners, interlocking arrangements, welding and the like.

Cinch lines 36 comprised flexible or bendable lines configured to be secured to post 24 by posts 34 and further configured to be wrapped about tree trunk 22 to cinch post 24 to tree trunk 22. In the example illustrated, cinch lines 36 comprise straps which wrap about tree trunk 22 and which have slits receiving post 34 or which are connected to post 34 in other fashions. In other embodiments, cinch lines 36 may comprise cables or other elongate flexible members having portions configured to be connected to post 34 in other manners.

Figure 5:
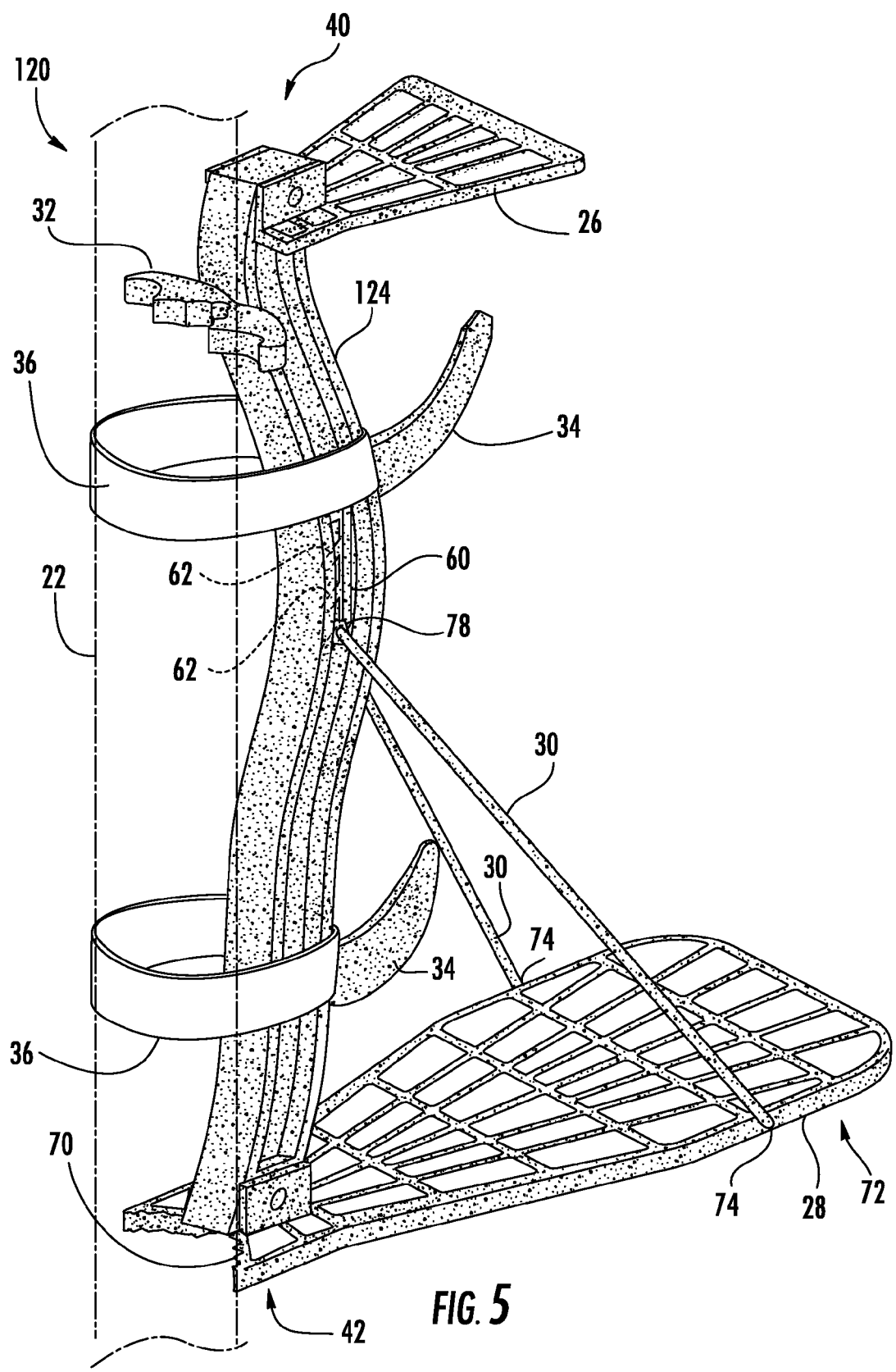
FIG. 5 is a perspective view of another embodiment of the tree stand of FIG. 1 mounted to a tree according to an example embodiment.
Figure 9:
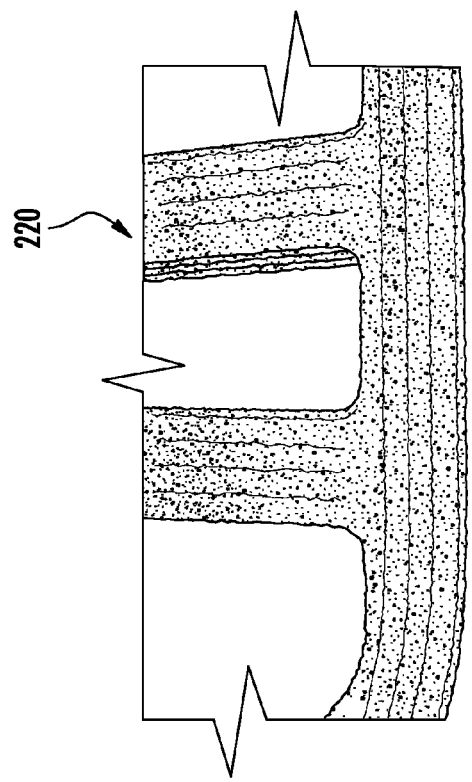
FIG. 9 is an enlarged fragmentary perspective view of the tree stand of FIG. 8.
Figure 18:
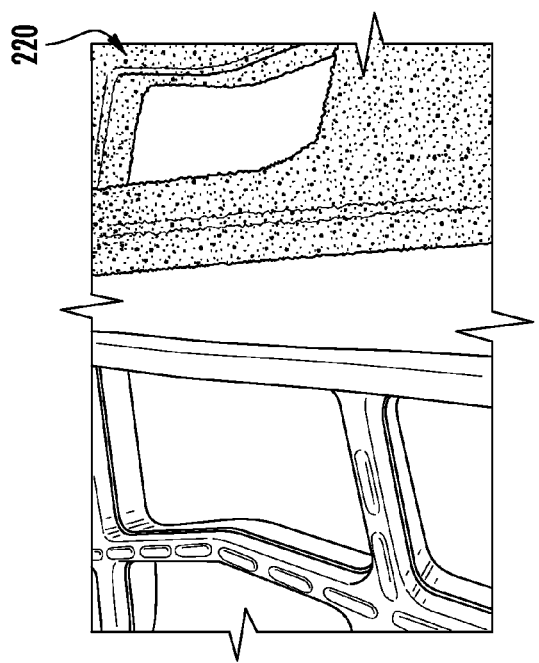
FIG. 18 is an enlarged fragmentary perspective view of a portion of the tree stand of FIG. 14 beside an alternative tree stand.
Figure 8:
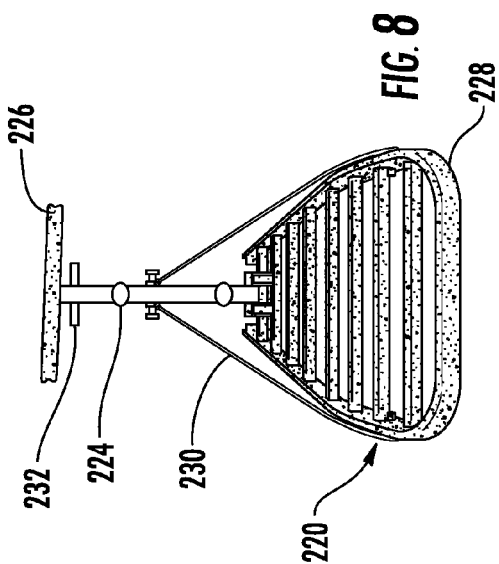
FIG. 8 is a front elevational view of another example of the tree stand of FIG. 1.
Figure 10:
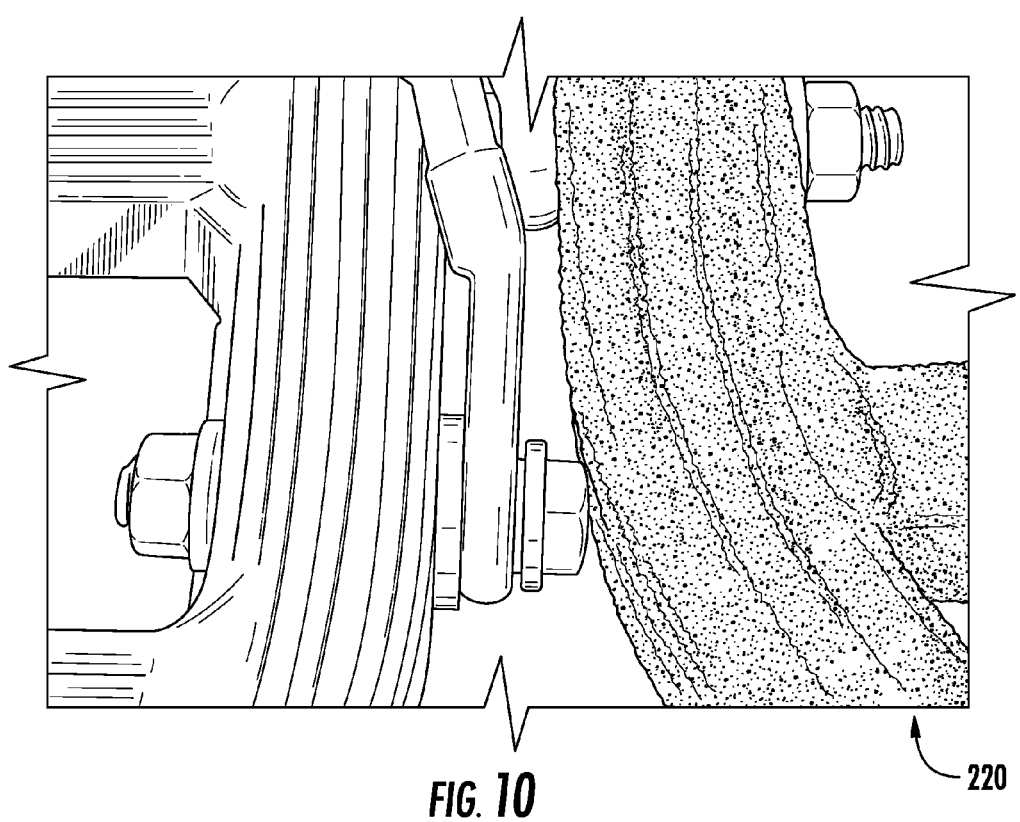
FIG. 10 is a fragmentary perspective view of the tree stand of FIG. 8 beside an alternative tree stand.
Figure 15:
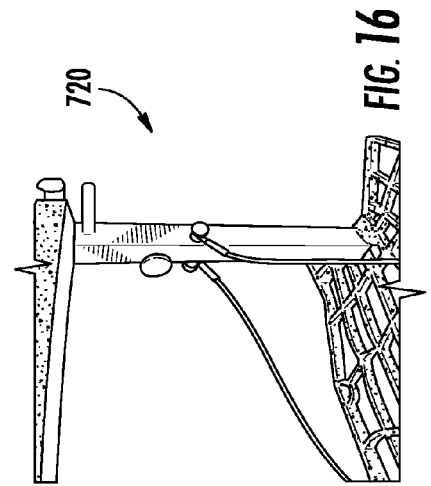
FIG. 15 is an enlarged fragmentary front perspective view of the tree stand FIG. 14.
Figure 16:
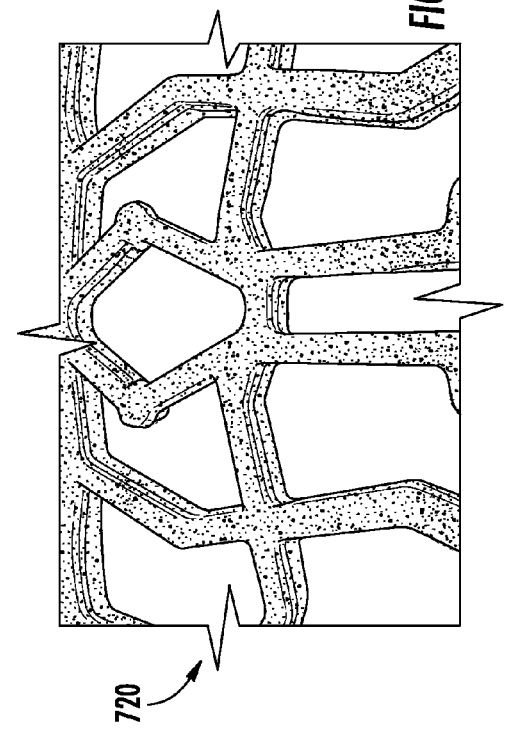
FIG. 16 is an enlarged fragmentary perspective view of the tree stand of FIG. 14.
Figure 14:
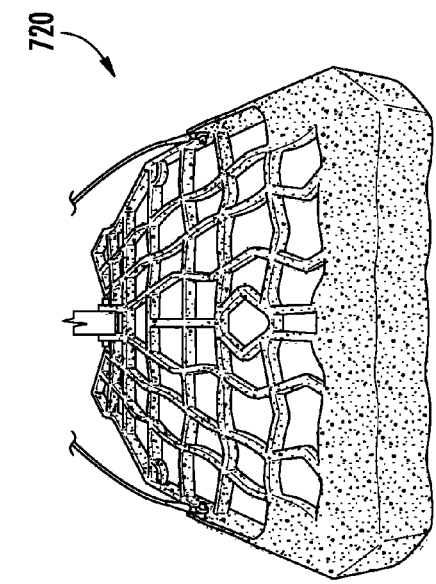
FIG. 14 is a front perspective view of another example of the tree stand of FIG. 1.
Figure 17:
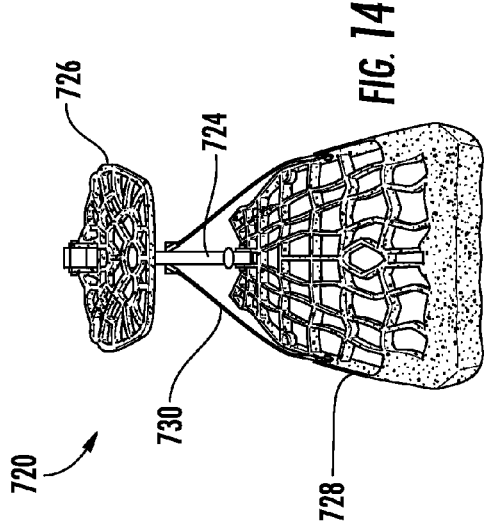
FIG. 17 is an enlarged fragmentary perspective view of the tree stand of FIG. 14.

FIGS. 5-7 illustrate tree stand 120, another embodiment of tree stand 20. Tree stand 120 is similar to tree stand 20 except that tree stand 120 includes tree stand post 124 instead of post 24. Tree stand post 124 is similar to tree stand post 24 except that post 124 includes multiple bends or curved portions so as to simulate a shape of a vine or tree branch. Those remaining elements of tree stand 120 and those portions of post-124 which correspond to elements of tree stand 20 and post 24 are numbered similarly.

As best shown in FIG. 6, post 124 has a plurality of longitudinally extending bends 200, 202 between ends 40 and 42. Bends 200 and 202 are consecutive and extend oblique with respect to one another and with respect to the general longitudinal axis extending between ends 40 and 42. In the example illustrated, bends 40 and 42 are aligned with one another. In other words, as shown in FIG. 7, longitudinal centerlines 203, 204 of ends 40 and 42 coincide with one another. In other embodiments, such longitudinal centerlines 203, 204 may be offset with respect to one another.

Bend 200 has a concave side facing in a same direction as that of claw 32 are facing in the same direction that claw 32 extends or projects from post 124. Bend 200 has an opposite convex side 208 facing in the same direction as the direction at which posts 34 projects from post 124. Bend 202 bends in a substantially opposite direction. Bend 202 has a convex side 210 facing in the same direction as claw 32 and an opposite concave side facing in the same direction as that of posts 34. The multiple bends or longitudinal curves of post 124 simulates a tree branch or tree trunk, enhancing the inconspicuous nature of tree stand 120 and improving wildlife observation or hunting results.

Although post 124 is illustrated as having a pair of consecutive bends, in other embodiments, post 124 may have a fewer or greater of such bends or longitudinal curves and such curves or bends may be spaced by linear segments. By having two or more curves or bends, post 124 may better simulate a tree trunk or tree branch as compared to a single bend or curve. As with post 24, post 124 has a non-tubular shape to reduce noise generation. As with post 24, post 124 has an I-shaped cross-section. In the example illustrated, post 124 is integral as a single unitary body with claw 32 and posts 34 to further reduce noise generation. In the example illustrated, post 124 and the integral features such as claw 32 and posts 34 are cast. In one embodiment, post 124 and the integral features are cast out of one of more metals such as aluminum. In other embodiments, post 124 and the integral features maybe formed from other metals, ceramics, plastics and the like and may be formed using methods other than casting.

Similar to tree stand 20, the exterior surfaces of post 124, seat 26 and foot platform 28 are coated with a rubber or polymeric elastomeric coating having a thickness of at least ⅛ of an inch and serving as a sound dampening interface. In one embodiment, substantially and entirety of each of post 124, seat 26 and foot platform 28 are encapsulated with the sound dampening interface coating. In other embodiments, other sound dampening interface structures may comprise separate structures formed from rubber or polymeric materials which are fastened, bonded, fused, welded, snapped on to, clamped, pinned or otherwise retained at locations so as to extend between and concurrently or simultaneously contact post 124 and seat 26 or post 124 and platform 28.

FIGS. 8-12 illustrate tree stand 220, another embodiment of tree stand 120. Tree stand 220 includes post 224, seat 226, foot platform or lower platform 228, platform support line 230, tree claw 232, cinch lines 34 (shown in FIG. 1) and tree straps 36 (shown in FIG. 1). Post 224, seat 226 and lower platform 228 are similar in function as post 24, seat 26 and platform 28 except that post 224, seat 226 lower platform 228 are each formed from hollow metal tubing. Similar to post 24, seat 26 and platform 28, post 224, seat 226 and platform 228 each have an exterior surface substantially (greater than 80%), if not completely, coated with a sound dampening interface material comprising a rubber-like, elastomeric polymer or rubber material having a thickness of at least ⅛ of an inch. Platform support line 230, tree claw 232, cinch line 34 and tree straps 36 are structurally similar to an function in similar fashions to support line 30, tree claw 32, cinch line 34 and tree straps 36 described above. In one embodiment, tree claw 232 may additionally be coated with a layer of one or more sound dampening interface materials similar to the coatings applied to post 224.

FIG. 11 is a sectional view of one of the tubes of tree stand 220. In particular, FIG. 11 illustrates an inner metallic or metal tube or beam 300 coated with a sound interface layer 302. Interface layer 302 had a thickness of at least ⅛ of an inch and nominally between ⅛ of an inch and ¼ of an inch. According to one example embodiment in which interface 302 comprises a coating, interface 302 comprises a polyurethane material having a thickness of at least ⅛ of an inch (3 mm) with a Shore A hardness of at least about 88+/−5 ASTM D-2240. In one embodiment, the coating of interface 302 is textured or dimpled. In another embodiment, the coating is smooth. In yet other embodiments, the coating of interface 302 may be formed from other materials. In the example illustrated, each of post 224, seat 226 and platform 228 are formed from tubular members, wherein each tubular member is surrounded or encapsulated by interface 302. In other embodiments, one or more of post 224, seat 226 or platform 228 may be formed from cast materials coated with interface 302.

FIG. 12 is a sectional view through a portion of tree stand 420, another embodiment of tree stand 220. Tree stand 420 is identical to tree stand 220 in all respects except that one or more of the tubular members forming one or more of post 224, seat 226 or platform 228 has a hollow interior 500 substantially, if not completely, filled with sound absorbing or sound dampening material 502 such as foam or the like. Although not specifically illustrated, in yet another embodiment, one or more of the tubular members 300 of tree stand 420 may additionally include sound dampening interface 302 on exterior surfaces such as shown in FIG. 11.

FIG. 13 is a sectional view through a portion of tree stand 620, another embodiment of tree stand 220. Tree stand 620 is identical to tree stand 220 in all respects except that one or more of the tubular members forming one or more of post 224, seat 226 or platform 228 as a hollow interior 500 coated with sound absorbing or sound dampening material 602 such as foam or the like. In one embodiment, interior coating of material 602 has a thickness of at least ⅛ of an inch. Although not specifically illustrated, in yet another embodiment, one or more of the tubular members 300 of tree stand 620 may additionally include sound dampening interface 302 on exterior surfaces such as shown in FIG. 11.

FIGS. 14-19 illustrate tree stand 720, another embodiment of tree stand 20. Tree stand 720 includes post 724, seat 726, foot platform or lower platform 728, platform support line 730, tree claw 32 (shown in FIG. 1), cinch lines 34 (shown in FIG. 1) and tree straps 36 (shown in FIG. 1). Post 724 serves as a backbone, spine or rigid support member configured to extend along tree trunk 22 (shown in FIG. 1) in a vertical direction. Post 724 supports one or more platforms and secures the one more platforms to tree trunk 22. In the example illustrated, post 724 supports and secures two platforms, seat platform 726 and foot platform 728, to one another and to tree trunk 22. In other embodiments, tree stand post 724 may secure and mount a greater or fewer of such platforms.

Post 724 comprise a hollow tube. In the example illustrated, post 724 has an exterior surface substantially (greater than 80%), if not completely, coated with a sound dampening interface material comprising a rubber-like, elastomeric polymer or rubber material having a thickness of at least ⅛ of an inch. In one embodiment, the exterior surface of post 724 is coated with a sound interface layer 302 (also shown in FIG. 11). Interface layer 302 had a thickness of at least ⅛ of an inch and nominally between ⅛ of an inch and ¼ of an inch. According to one example embodiment in which interface 302 comprises a coating, interface 302 comprises a polyurethane material having a thickness of at least ⅛ of an inch (3 mm) with a Shore A hardness of at least about 88+/−5 ASTM D-2240. In one embodiment, the coating of interface 302 is textured or dimpled. In another embodiment, the coating is smooth. In yet other embodiments, the coating of interface 302 may be formed from other materials.

In another embodiment, post 724 has a hollow interior 500 substantially if not completely filled with sound absorbing or sound dampening material 502 such as foam or the like (shown in FIG. 12). In yet another embodiment, post 724 may include a layer 602 of sound damping material coating the interior surface 500 (such as shown by FIG. 13).

Seat 726 and lower platform 728 are similar to seat 26 and platform 28 shown in FIG. 1. As a seat 26 and lower platform 28, seat 76 and platform 728 are each coated with a sound dampening interface 73 (described above). As a result, vibration and noise is reduced when transporting, mounting and using tree stand 720.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A tree stand comprising:
   a metal post;
   a lower platform pivotably coupled to the metal post for pivoting between a platform extended position and a platform folded position;
   an upper seat pivotably coupled to the post for pivoting between a seat extended position and a seat folded position; and
   a rubber or polymeric interface having a thickness of at least 1/8 of an inch and contacting the post and at least one of the lower platform when the lower platform is in the platform folded position and the upper seat when the upper seat is in the seat folded position,
   wherein the metal post has an "I" cross sectional shape with a first plate portion, a second plate portion parallel to the first plate portion and an intermediate plate portion interconnecting and extending perpendicular to the first plate portion and the second plate portion and wherein the interface encapsulates at least the first plate portion;
   wherein the first plate portion comprises a first face, a second face opposite the first face and a perforation through the first plate portion between the first face and the second face, wherein the interface comprises:
   a first interface portion on the first face of the first perforate plate portion;
   a second interface portion extending from the first interface portion through the perforation; and
   a third interface portion extending from the second interface portion on the second face of the first perforate plate portion.

2. The tree stand of claim 1, wherein the interface is on each of the post and one of the lower platform and the upper seat.

3. The tree stand of claim 2, wherein the interface is on the other of said one of the lower platform and the upper seat.

4. The tree stand of claim 1, wherein the lower platform is metallic and where the interface encapsulates the lower platform.

5. The tree stand of claim 4, wherein the lower platform comprises a lattice arrangement of metal strips and wherein the interface encapsulates each metal strip while preserving interstices of the lattice arrangement.

6. The tree stand of claim 1, wherein the upper seat is metallic and wherein the interface encapsulates the upper seat.

7. The tree stand of claim 1, wherein the interface covers substantially an entirety of an exterior of the metal post.

8. The tree stand of claim 1, wherein the lower platform and the upper seat are each metallic and wherein the interface encapsulates each of the lower platform, the upper seat and an exterior of the metal post.

9. The tree stand of claim 1, wherein the interface is elastomeric.

10. The tree stand of claim 1, wherein the first plate portion has first opposite edges, wherein the second plate portion has second opposite edges, wherein the intermediate plate portion extends from a first location on the first plate portion that is equidistantly spaced from the first opposite edges and wherein the intermediate plate portion extends to a second location on the second plate portion that is equidistantly spaced from the second opposite edges.

11. The tree stand of claim 1, wherein the second interface portion completely fills the perforation between the first face of the first perforate plate portion and the second face of the first perforate plate portion.

12. A tree stand comprising:
    a metal post;
    a lower platform pivotably coupled to the metal post for pivoting between a platform extended position and a platform folded position;
    an upper seat pivotably coupled to the post for pivoting between a seat extended position and a seat folded position; and
    a rubber or polymeric interface having a thickness of at least 1/8 of an inch and contacting the post and at least one of the lower platform when the lower platform is in the platform folded position and the upper seat when the upper seat is in the seat folded position, wherein the metal post has an "I" cross sectional shape with a first perforate plate portion, a second perforate plate portion parallel to the first plate and an intermediate plate portion interconnecting and extending perpendicular to the first plate portion and the second plate portion, wherein the interface extends through at least one of the first perforate plate portion and the second perforate plate portion.

13. The tree stand of claim 12, wherein the interface fills at least one perforation through at least one of the first perforate plate portion and the second perforate plate portion.

14. The tree stand of claim 12, wherein the interface comprises:
    a first interface portion on a first face of the first perforate plate portion;
    a second interface portion extending from the first interface portion through a perforation in the first perforate plate portion; and
    a third interface portion extending from the second interface portion on a second face of the first perforate plate portion opposite the first face.

15. The tree stand of claim 14, wherein the second interface portion completely fills the perforation between the first face of the first perforate plate portion and the second face of the first perforate plate portion.

* * * * *